US010528220B2

(12) United States Patent
Loi et al.

(10) Patent No.: US 10,528,220 B2
(45) Date of Patent: Jan. 7, 2020

(54) ELECTRONIC DEVICE AND OPERATION METHOD OF BROWSING NOTIFICATION THEREOF

(71) Applicant: ASUSTEK COMPUTER INC., Peitou, Taipei (TW)

(72) Inventors: Wean-Fong Loi, Taipei (TW); Yue-Hin Victor Kong, Taipei (TW); Ee-Fun Teo, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/863,120

(22) Filed: Jan. 5, 2018

(65) Prior Publication Data

US 2018/0210629 A1 Jul. 26, 2018

(30) Foreign Application Priority Data

Jan. 25, 2017 (TW) .............................. 106103045 A

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0482* (2013.01); *G06F 3/04855* (2013.01); *G06F 3/04883* (2013.01); *G04G 21/08* (2013.01)

(58) Field of Classification Search
CPC .... G06F 3/04817; G06F 1/163; G06F 1/1643; G06F 1/1652; G06F 3/0482;
(Continued)

(56) References Cited

U.S. PATENT DOCUMENTS 6,556,222 B1 * 4/2003 Narayanaswami .. G04G 9/0064
368/295
8,860,674 B2 10/2014 Lee et al.
(Continued)

FOREIGN PATENT DOCUMENTS

CN 102043584 A 5/2011
CN 104866221 A 8/2015
CN 106067834 A 11/2016

*Primary Examiner* — David Phantana-angkool
(74) *Attorney, Agent, or Firm* — Muncy, Geissler, Olds & Lowe, PC

(57) ABSTRACT

An electronic device and an operation method of browsing notification thereof are provided. The electronic device includes a body and a touch display. The operation method of browsing notification comprises: displaying a notification image on the touch display when an instruction of sliding along a first direction is received at the touch display, the notification image includes an information display area and an operation area, and the operation area includes a plurality of notification icons; displaying a first notification corresponding to a first notification icon at the information display area when the first notification icon of the notification icons receives a touch instruction at a first position; and converting to display a second notification corresponding to the second notification icon at the information display area when the touch instruction slides from the first position to a second notification icon of the notification icons at a second position.

18 Claims, 13 Drawing Sheets

(51) Int. Cl.
*G06F 3/0488* (2013.01)
*G06F 3/0482* (2013.01)
*G06F 3/0485* (2013.01)
*G04G 21/08* (2010.01)

(58) Field of Classification Search
CPC ............... G06F 3/0485; G06F 3/04855; G06F 3/04883; G06F 3/04886; G04G 21/08
USPC ......................................................... 715/786
See application file for complete search history.

(56) References Cited

U.S. PATENT DOCUMENTS

| | | | |
|---|---|---|---|
| 9,367,086 B2* | 6/2016 | Yilmaz | G04G 9/0064 |
| D798,293 S * | 9/2017 | Park | D14/344 |
| 9,817,481 B2* | 11/2017 | Pantelopoulos | A61B 5/6802 |
| 9,936,057 B2* | 4/2018 | Kim | G04B 19/00 |
| 9,939,923 B2* | 4/2018 | Sharma | G06F 3/0312 |
| 10,122,709 B2* | 11/2018 | Momchilov | H04W 12/0023 |
| 10,268,432 B2* | 4/2019 | Kyung | G06F 3/14 |
| 10,317,897 B1* | 6/2019 | Kentley-Klay | G05D 1/0016 |
| 10,341,340 B2* | 7/2019 | Vielhaber | H04L 63/0861 |
| 10,345,986 B1* | 7/2019 | No | G06F 3/017 |
| 2009/0059730 A1* | 3/2009 | Lyons | G04G 21/08 368/69 |
| 2015/0049591 A1* | 2/2015 | Adams | G04G 21/08 368/13 |
| 2016/0313869 A1* | 10/2016 | Jang | G06F 3/0481 |
| 2017/0060100 A1* | 3/2017 | Loi | G04G 21/08 |
| 2018/0203486 A1* | 7/2018 | Loi | G06F 1/1652 |
| 2018/0210629 A1* | 7/2018 | Loi | G06F 1/163 |
| 2018/0210637 A1* | 7/2018 | Loi | G06F 3/04847 |

* cited by examiner

ELECTRONIC DEVICE AND OPERATION METHOD OF BROWSING NOTIFICATION THEREOF

CROSS-REFERENCE TO RELATED APPLICATION

This application claims the priority benefit of TW application serial No. 106103045, filed on Jan. 25, 2017. The entirety of the above-mentioned patent application is hereby incorporated by references herein and made a part of specification.

BACKGROUND OF THE INVENTION

Field of the Invention

The disclosure relates to an electronic device and, more specifically, relates to a wearable electronic device.

Description of the Related Art

More and more types of wearable electronic devices are launched. For example, a smart watch worn on the wrist usually includes many functions, such as the function of answering calls, viewing notifications, transceiving messages, playing music or monitoring a heart rate. However, since the wearable electronic device is configured to be worn on the wrist, the size of the wearable electronic device is usually not large enough, and the touch screen is usually small, which is inconvenient for the touch operation.

In addition, the setting or the operation mode of numerical values can be changed via vertical or horizontal gestures or by scrolling the numerical value on the display screen via a physical dial. However, the operation of the gestures is complicated and inconvenient for users. Moreover, most of the display screen is covered by the user's fingers in the operation, and thus it's difficult for the user to view the content.

BRIEF SUMMARY OF THE INVENTION

According to a first aspect, an operation method of browsing notification of an electronic device is provided. The electronic device includes a body and a touch display. The operation method of browsing notification comprises the following steps. A notification image is displayed on the touch display when an instruction of sliding along a first direction is received at the touch display. The notification image includes an information display area and an operation area, and the operation area includes a plurality of notification icons. A first notification is displayed corresponding to a first notification icon at the information display area when the first notification icon of the notification icons receives a touch instruction at a first position. A second notification converted to display corresponding to the second notification icon at the information display area when the touch instruction slides from the first position to a second notification icon of the notification icons at a second position.

According to a second aspect, an electronic device is provided. The electronic device comprises a touch display, a body, a processing unit disposed in the body, and a memory unit disposed in the body.

The memory unit is electrically connected to the processing unit. A program instruction is stored in the memory unit. When the program instruction is executed by the processing unit, the processing unit performing: displaying a notification image on the touch display when an instruction of sliding along a first direction is received at the touch display, the notification image includes an information display area and an operation area, and the operation area includes a plurality of notification icons; displaying a first notification corresponding to a first notification icon at the information display area when the first notification icon of the notification icons receives a touch instruction at a first position; converting to display a second notification corresponding to the second notification icon at the information display area when the touch instruction slides from the first position to a second notification icon of the notification icons at a second position.

In sum, in the electronic device and the operation method of browsing notification thereof, when the notification image is displayed and the notification icons receives the touch instructions at the first position, the first notification corresponding to the notification icon is displayed on the information display area. When the user slides to the other notification icon in the second position from the first position, the second notification corresponding to the second notification icon is converted to be displayed at the information display area. As a result, during the operation, users can browse notification contents conveniently and quickly in the limited operation area. Moreover, the operations are executed in a specific area of the display image. Then, the covered area of the display image is kept in a smallest range, which is convenient to view the notification content for users.

DETAILED DESCRIPTION OF THE EMBODIMENTS

An electronic device and an operation method of browsing notification thereof are illustrated by referring to the figures. The same numbers denote the same components. In an embodiment, the electronic device is a smart watch, a phone or a notebook computer, which is not limited herein. In an embodiment, the electronic device is a smart watch.

Figure 1A:
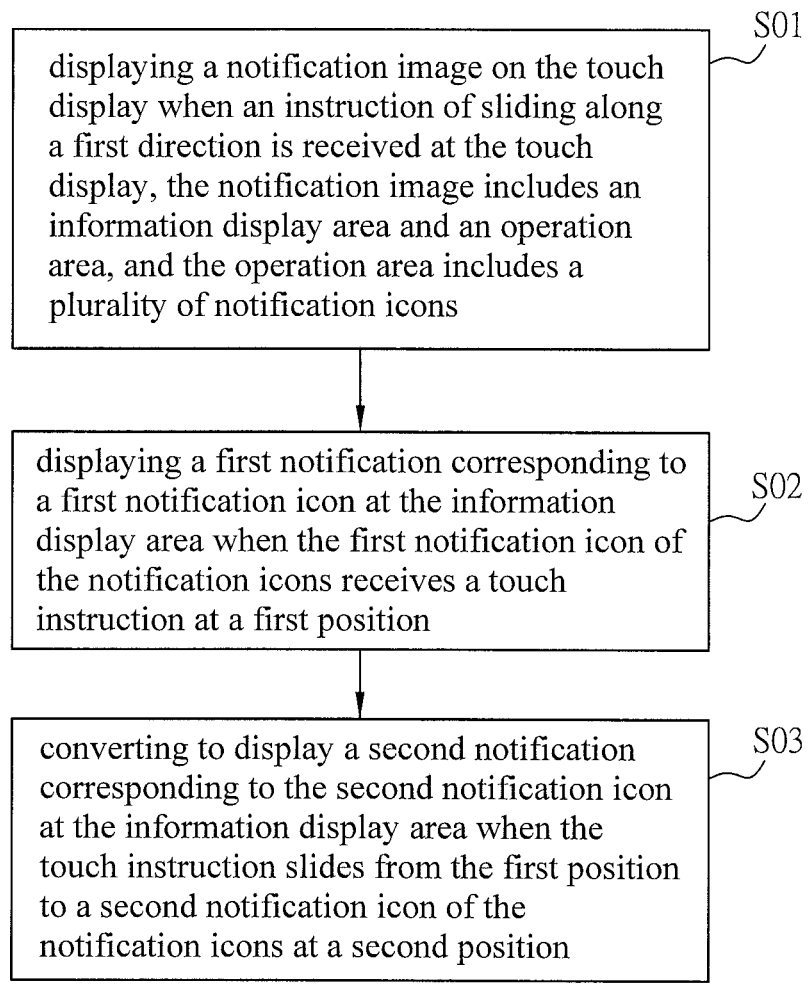
FIG. 1A is a flow chart showing an operation method of browsing notification of a smart watch in an embodiment.
Figure 1B:
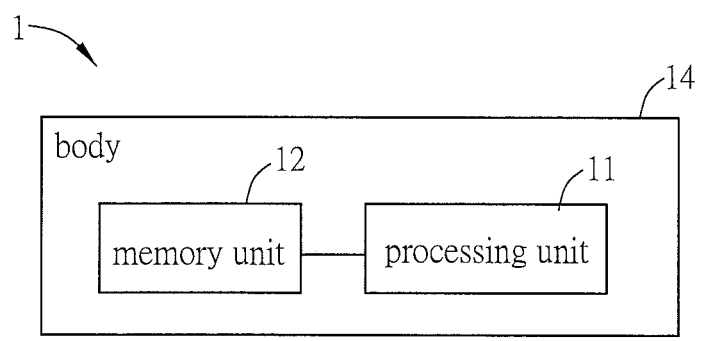
FIG. 1B is a block diagram showing a smart watch in an embodiment.
Figure 1C:
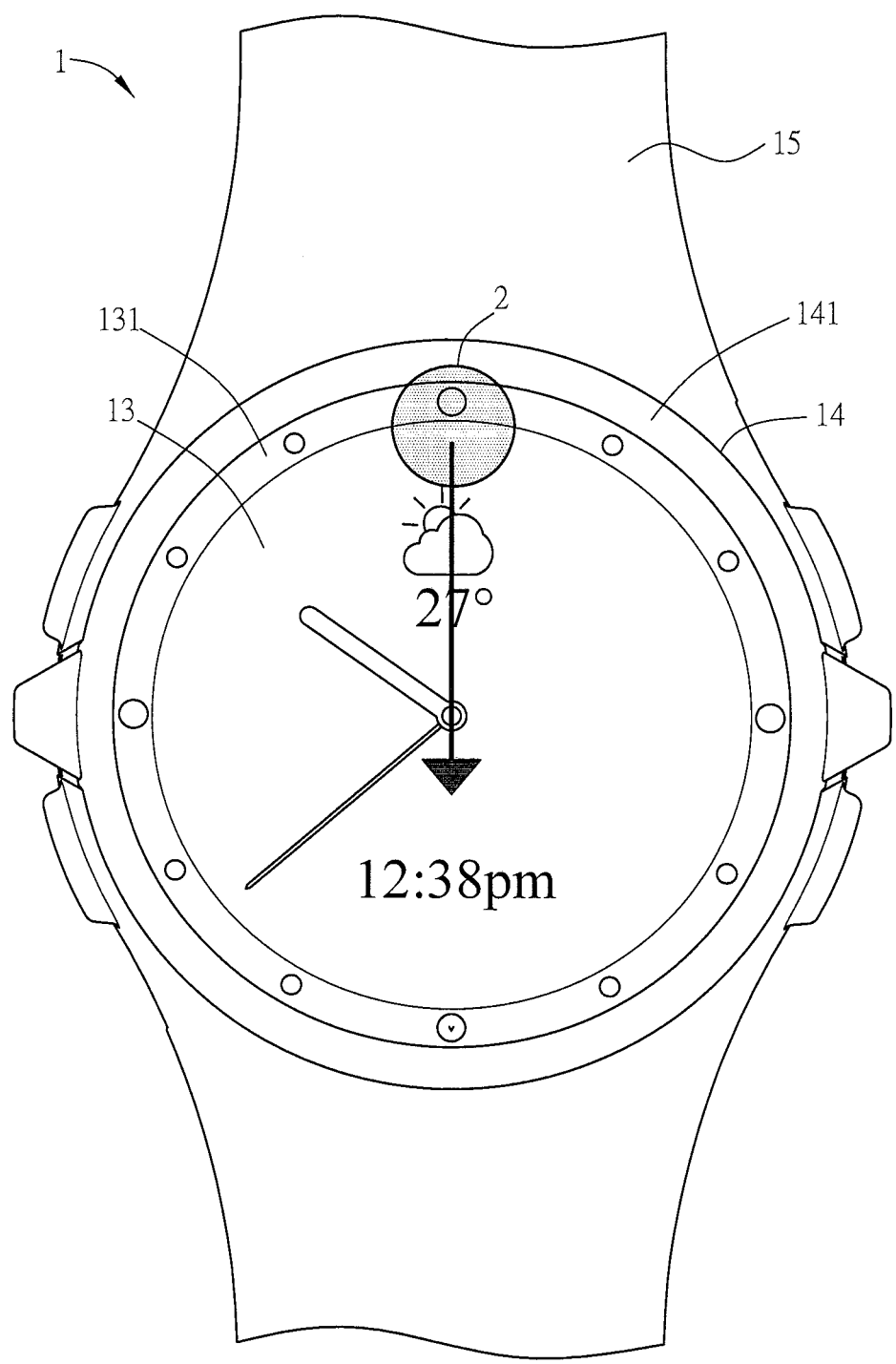
FIG. 1C is a schematic diagram showing an appearance of a smart watch in an embodiment.
Figure 1D:
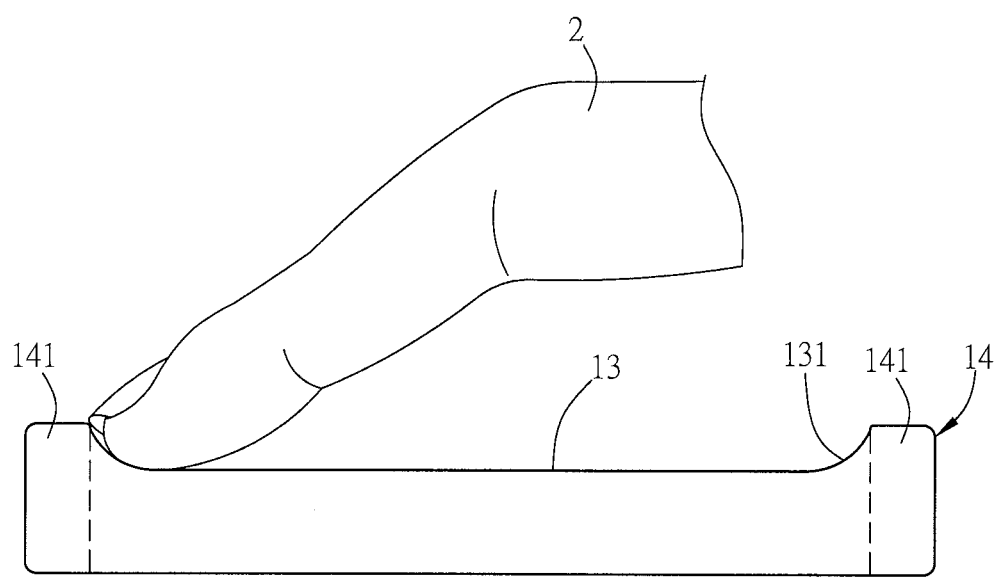
FIG. 1D is a schematic diagram showing an operation of a smart watch in an embodiment.

Please refer to FIG. 1A to FIG. 1D. FIG. 1A is a flow chart showing an operation method of browsing notification of a smart watch in an embodiment. FIG. 1B is a block diagram showing a smart watch in an embodiment. FIG. 1C is a schematic diagram showing an appearance of a smart watch in an embodiment. FIG. 1D is a schematic diagram showing an operation of a smart watch 1 in an embodiment. In an embodiment, the notification is a message notification, an information notification of social software, a mail notification, a telephone notification or a system updating notification, which is not limited herein.

In an embodiment, a smart watch includes a body and a touch display. The touch display is configured to display an image and receive a touch operation of a user. In an embodiment, the touch display of the smart watch displays a function image in default before operations of browsing notifications. As shown in FIG. 1A, the operation method of browsing notification includes the following steps. A notification image is displayed on the touch display when the touch display receives an instruction of sliding along a first direction. The notification image includes an information display area and an operation area. The operation area includes a plurality of notification icons (step S01). When a first notification icon of the notification icons receives a touch instruction on a first position, a first notification corresponding to the first notification icon is displayed on the information display area (step S02). When the touch instruction is changed to a second notification icon of the notification icons on a second position from the first position, the information display area is converted to display a second notification corresponding to the second notification icon (step S03). The operation method of browsing notification and the operation process are illustrated in detail by referring to FIG. 1B to FIG. 2I.

As shown in FIG. 1B, in an embodiment, the smart watch 1 includes a processing unit 11, a memory unit 12, and a body 14. The memory unit 12 is electrically connected to the processing unit 11 via a bus. The processing unit 11 and the memory unit 12 are disposed in the body 14, respectively. In the embodiment, the number of the processing unit 11 and the number of the memory unit 12 in the body 14 is one, which is not limited herein. In another embodiment, multiple processing units 11 or multiple memory units 12 are configured in the body 14.

The processing unit 11 is configured to access data stored in the memory unit 12. The processing unit 11 includes control components. In an embodiment, the processing unit 11 includes a central processing unit (CPU) and a memory, or other control hardware, software or firmware, which is not limited.

The memory unit 12 is configured to store at least one application software, such as APP software including one or more instructions. When the user browses notification to make the program instruction be executed by the processing unit 11, the processing unit 11 executes the step S01 to S03, which is illustrated in detail hereinafter.

In an embodiment, the memory unit 12 is a non-transitory computer readable storage medium, such as a memory, a memory card, a compact disc, a video tape, a computer tape, or any combination thereof. In an embodiment, the memory is a read-only memory (ROM), a flash memory, or a Field-Programmable Gate Array (FPGA), or a combination thereof. In an embodiment, the memory unit 12 is a memory in the smart watch 1. In an embodiment, the memory unit 12 is a cloud memory at a cloud device. The application software is stored in the cloud device. The application software is executed after the application software is loaded to the smart watch 1 from the cloud device.

In addition, please refer to FIG. 1C and FIG. 1D, the smart watch 1 further includes a touch display 13 and a watch band 15. The watch band 15 is connected to the body 14 and is worn on the wrist. The body 14 includes a bezel 141 surrounding the touch display 13. A height of the bezel 141 is higher than that of the touch display 13. In addition, the touch display 13 includes a peripheral region 131. The peripheral region 131 is at the outer periphery of the touch display 13. The peripheral region 131 is connected to the bezel 141. As shown in FIG. 1D, the height of the peripheral region 131 is decreased gradually from the height of the bezel 141 to the height of an inner side of the touch display 13. Thus, an object 2 (such as finger) slides along the peripheral region 131 of the touch display 13 conveniently.

Moreover, the object 2 is prevented from sliding out of the touch display 13 via a blocking of the bezel 141 with a higher height.

Please refer to FIG. 1C and FIG. 2A to FIG. 2I. The detail of the steps and the process of the operation method of browsing notification are illustrated. FIG. 2A to FIG. 2I are schematic diagrams showing different display images of a touch display of a smart watch 1 in an embodiment.

The touch display 13 of the smart watch 1 includes a display and touch function. Then, the smart watch 1 is operated or controlled by touching the touch display 13 via the object 2, such as a finger or a touch stylus, or by sliding on the touch display 13. When the smart watch 1 receives a notification, a sound or a vibration is generated to notice the user.

First, the operation process of browsing notification includes that a notification image is displayed on the touch display when the touch display receives an instruction of sliding along a first direction. The notification image includes the information display area and the operation area. The operation area includes a plurality of notification icons (step S01). As shown in FIG. 1C, in an embodiment, the object 2 touches the periphery area 131 of the touch display 13 (a touch position of the object 2 is shown as a circle and is denoted as number 2), and slides (that is, along the first direction) from the periphery area 131 toward to a center part of the touch display 13 (from an outer side to an inner side of the touch display 13). After the instruction that the object 2 touches the touch display 13 and slides from outside to inside is received, the processing unit 11 controls the touch display 13 to change to display a notification image N from a function image (such as an analog clock shown in FIG. 1C). In an embodiment, the touch position is not limited to the 12 o'clock position of the periphery area 131 as shown in the embodiment. When the notification image N is shown, the object 2 can leave the touch display 13. In another embodiment, the sliding direction can be various according to requirement, for example, from the upside to the downside or from the downside to the upside, which is not limited to the sliding direction from the outside to the inside (the first direction) as shown in the embodiment.

In an embodiment of FIG. 2A to FIG. 2I, the notification image N displayed on the touch display 13 includes an information display area N1 and an operation area N2. The operation area N2 is located at a periphery of the information display area N1. The operation area N2 is at least partly overlapped with the periphery area 131. In other words, when the operation area N2 is located at the periphery of the information display area N1, the operation area N2 surrounds the whole information display area N1 or not. Moreover, the operation area N2 and the periphery area 131 of the touch display 13 are completely overlapped or partly overlapped, which is not limited herein. A plurality of the notification icons I are displayed on the operation area N2.

Figure 2A:
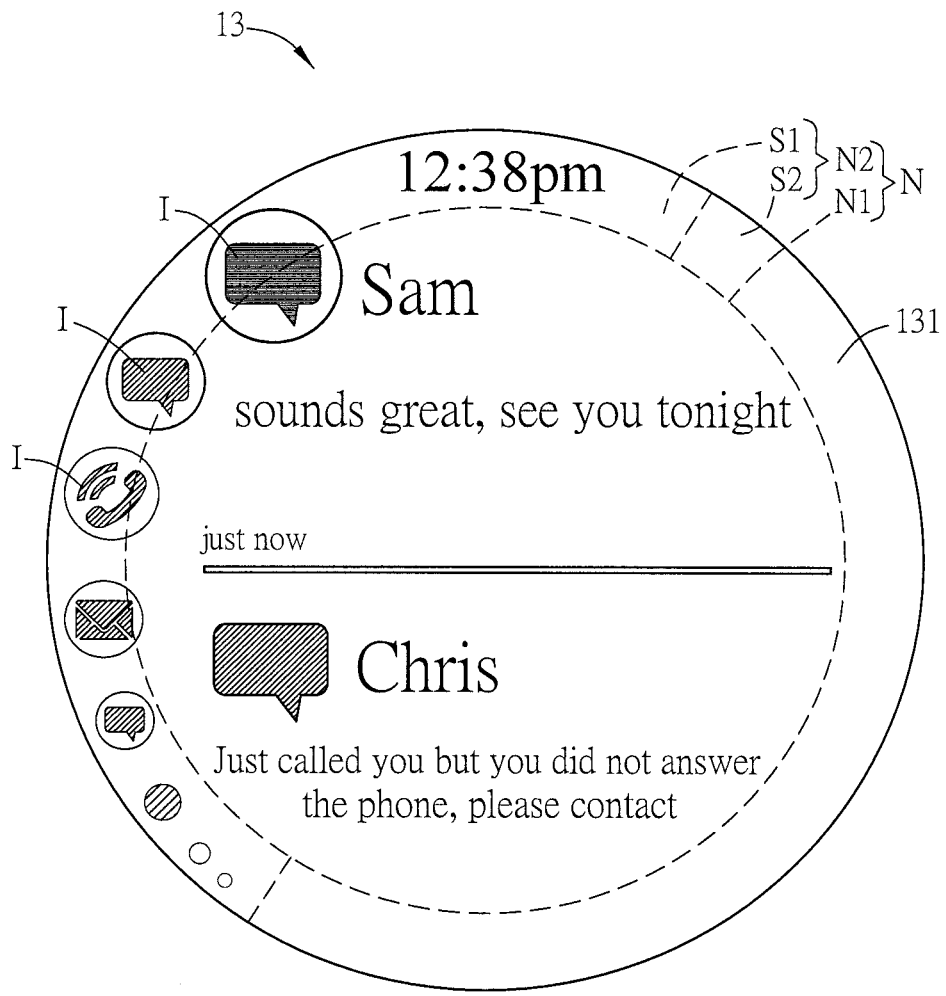
FIG. 2A to FIG. 2I are schematic diagrams showing different display images of a touch display of a smart watch respectively in an embodiment.

When the notification image N is displayed, the information display area N1 of the notification image N at least displays a notification recently. In an embodiment, the operation area N2 of the notification image N is divided into a first section S1 and a second section S2. In the embodiment, the first section S1 is at a left side of the notification image N. The second section S2 is at a right side of the notification image N. The positions of the first section S1 and the second section S2 are not limited herein. For example, the first section S1 is at a right side, an upper side or a lower side of the notification image N, which is not limited herein. In the embodiment, the notification image N includes a plurality of notifications (more than two). In an embodiment, the notification icons I are displayed on the first section S1 of the operation area N2 in a time order, which is not limited herein. For example, the notification icons I are ordered according to the time of receiving notifications. In the embodiment, the notification icon I is also called as a pattern or a symbol, which represents different kinds of notifications. In FIG. 2A, two message notification icons, a telephone notification icon, a mail notification icon, a message notification icon and so on are shown in sequence.

Moreover, an upper part of the information display area N1 of the notification image N includes the notification content most recently. In the embodiment, the notification content is the notification icon I representing a message pattern, a message title (the title is a name "Sam", which is not limited herein) and a notification content ("sounds great, see you tonight") corresponding to the message. Then, the readability of the notification is improved. In the embodiment, the notification icon I (message) of the information display area N1 and the first notification icon I in the upper left side of the operation area N2 are integrated into a same pattern. In addition, in the embodiment, a pattern (for example, the notification icon I of the message) of a next notification (that is, a notification generated earlier), a message tittle (such as "Chris") and a notification text corresponding to the message are displayed on a bottom half of the information display area N1.

Figure 2B:
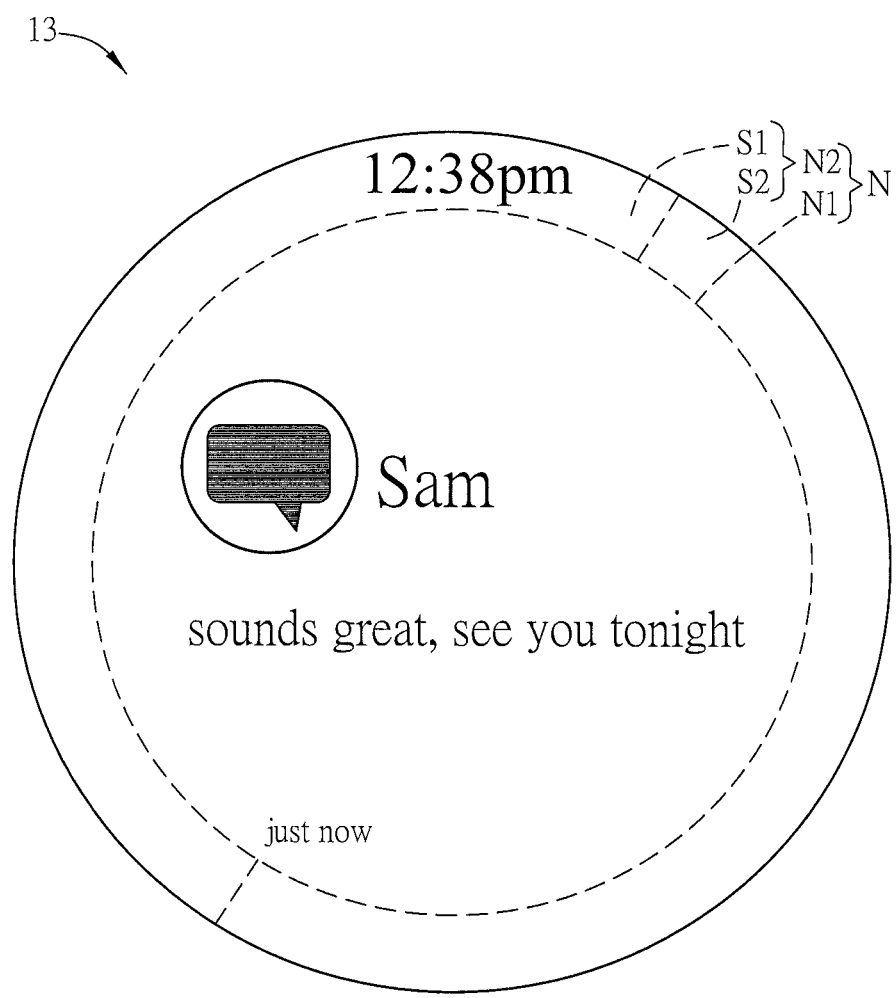
Figure 2C:
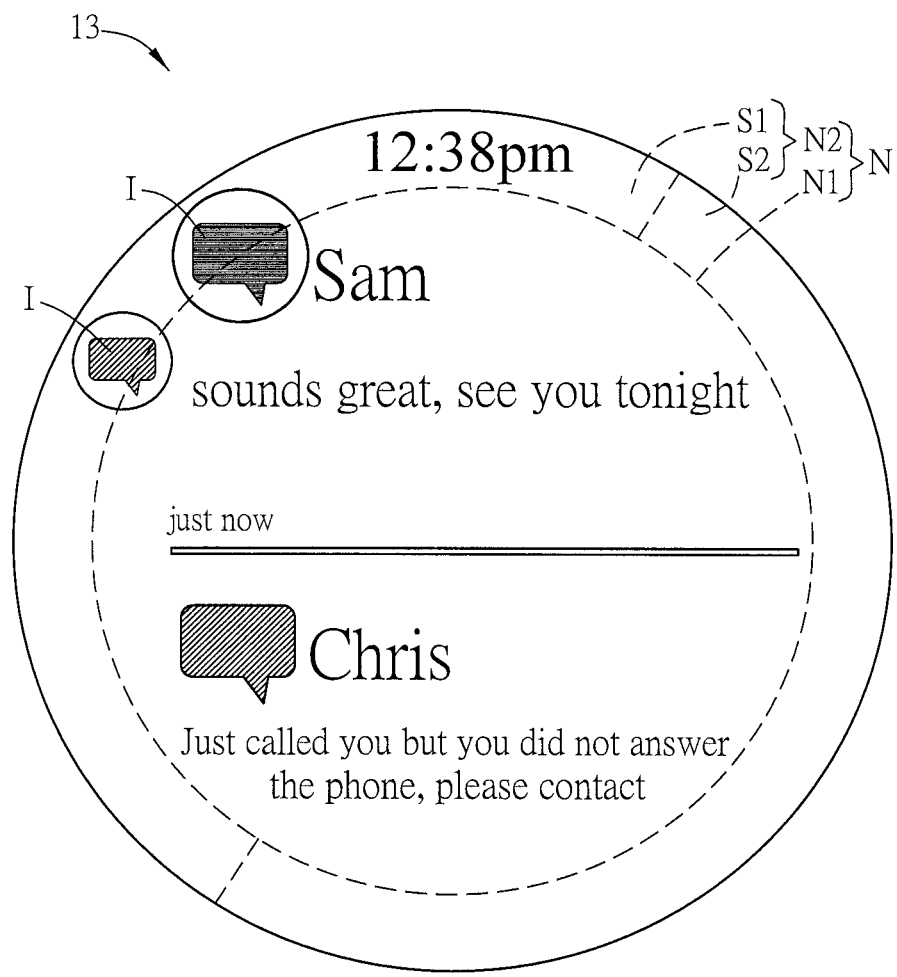

In an embodiment, as shown in FIG. 2B, when the number of the notification (such as a message) is one, no notification icon is displayed on the first section S1 of the operation area N2 of the notification image N while the information display area N1 displays the notification icon including the message, the corresponding title ("Sam") and the notification content ("sounds great, see you tonight"). In another embodiment, as shown in FIG. 2C, when the number of the notifications (such as two message notifications) is two, the first section S1 of the operation area N2 displays the notification icons I of the two messages, and the most recent message notification icon (the notification icon I in the upper side of the first section S1 and the notification icon of the information display area N1 are integrated into a same one), the corresponding title (such as "Sam") and the notification content are displayed on the upper half of the information display area N1, and a next (a notification is displayed earlier) notification icon (of the message), a corresponding title (such as "Chris") and a notification content are displayed in the lower part of the information display area N1. As a result, once the notification image N is displayed, the user can see the kind of the notification (notification icon I) at the information display area N1. The most recent notification icon, the corresponding title and the notification content are displayed on the information display area N1. Then, the readability of the notification is improved.

In addition, expect that the notification icons I are displayed in the first section S1 on the operation area N2 of the notification image N in a time order of the notifications, the size of the notification icons I are arranged in the operation area N2 in an order from big to small. In the embodiment, please refer to FIG. 2A, the size of the notification icon I (message) in the upper left side is biggest. The notification icons I from big to small are arranged along the periphery area 131 toward to the bottom left side according to arrival time of the notifications. The longer the display time of the notification is, the smaller the notification icon I is.

Please refer to FIG. 2D to FIG. 2I, FIG. 2D to FIG. 2I are schematic diagrams showing different notification images N of the touch display 13, respectively.

Figure 2D:
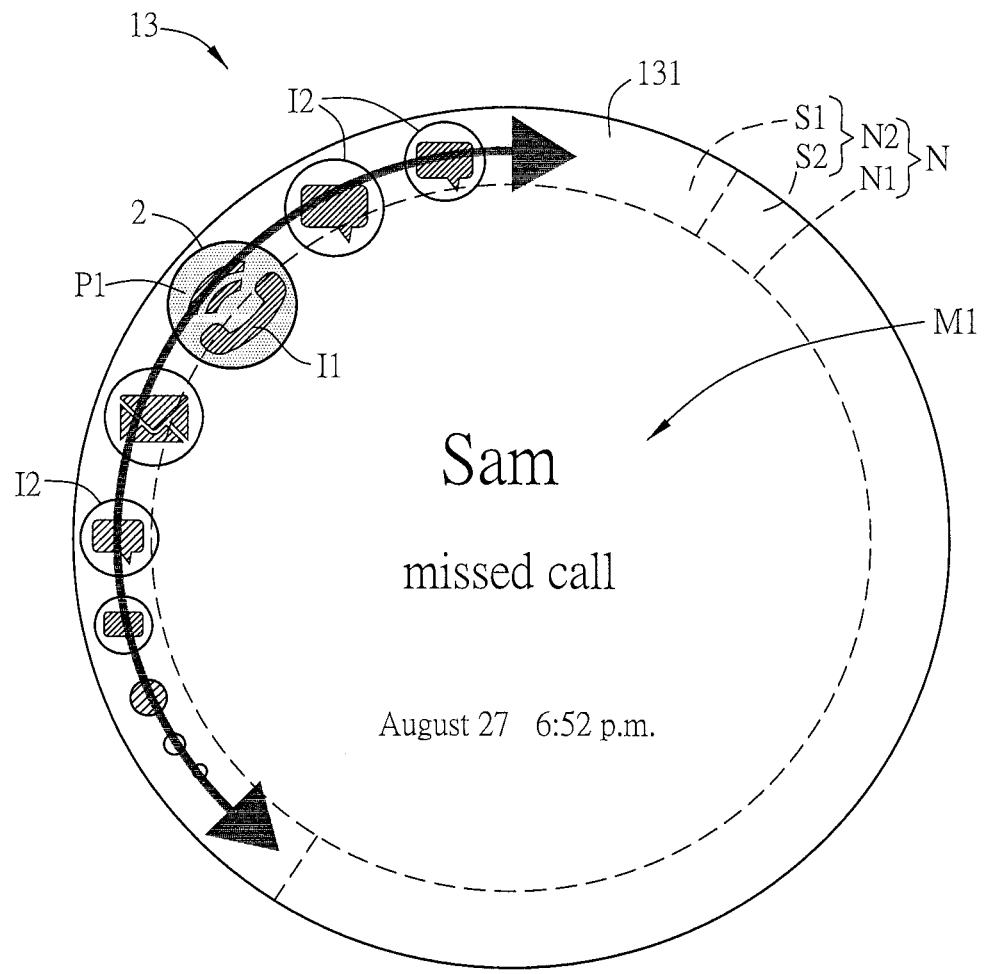

After the display image N is displayed on the touch display 13, the method of browsing notification further includes the following steps. When a touch instruction is received via a first notification icon of the notification icons at the first position, a first notification corresponding to the first notification icon is displayed on the information display area (step S02). In an embodiment, as shown in FIG. 2D, the first position P1 of the operation area N2 (a notification icon is displayed correspondingly on the first position P1) is touched via the object 2. After the processing unit 11 receives the touch instruction generated by touching the first position P1, the information display area N1 of the touch display 13 is controlled to display the first notification M1 for the notification icon corresponding to the first position P1. In the embodiment, a first notification icon I1 is displayed in the first position P1 where the operation area N2 is touched by the object 2. Then, the first notification M1 corresponding to the first notification icon I1 (the first position P1) is displayed at the information display area N1.

In an embodiment, since the first notification icon I1 with the telephone notification at the first position P1 of the operation area N2 is touched by the object 2, the information display area N1 displays the content of the first notification M1 corresponding to the first notification icon I1: "Sam missed call". In another embodiment, when the position touched by the object 2 displays the notification icon most recent, the information display area N1 displays the most recent notification. In an embodiment, the first position P1 touched by the object 2 can be any position on the first section S1 or the second section S2, which is not limited herein.

Moreover, except for the first notification icon I1, the operation area N2 displays a plurality of second notification icons I2. When the first position P1 receives the touch instruction, and the first position P1 corresponds to the first notification icon I1, the first notification icon I1 is highlighted. The highlight way includes the way of increasing a brightness but not changing the size, changing the size of the icon, changing a color, and anti-white, which is not limited herein.

In the embodiment in FIG. 2D, the size of the first notification icon I1 is enlarged to be highlighted. Then, the size of the first notification icon I1 is bigger than that of the second notification icon I2. In an embodiment, the size of the notification icons is changed gradually according to the distances between the notification icons and the first notification icon, respectively. In an embodiment, many second notification icons I2 are configured near the first notification icon I1. The size of the second notification icons I2 are changed gradually according to the distance between the second notification icons I2 and the first notification icon I1. In other words, the size of the notification icon I2 is from big to small when the distance between the second notification icon I2 and the first notification icon I1 from near to far. That is, the closer the second notification icon I2 and the first notification icon I1 is, the bigger the size of the second notification icon I2 is, and vice versa.

The operation process of browsing notification further includes the following steps. When the touch instruction slides to touch another notification icon (called as a second notification icon) in the second position of the notification icons from the first position, the information display area is converted to display a second notification corresponding to the another notification icon (step S03). In an embodiment, the object slides to the another notification icon at the second position P2 from the first position P1 along the periphery area 131. After the processing unit 11 receives an operation gesture sliding from the first position P1 to the second position P2, the processing unit 11 controls the information display area N1 of the touch display 13 to convert to display the second notification M2 corresponding to the another notification icon (the second position P2). In an embodiment, when the object slides along the periphery area 131, the object also slides along the bezel 141. Since the height of the bezel 141 is higher than that of the touch display 13, the object 2 is prevented from sliding out of the touch display 13. The sliding direction is in a clockwise direction or a counter clockwise direction (as shown by the arrow in FIG. 2D), which is not limited herein. In addition, since the gesture is operated along the periphery area 131, the covered area of the display image is smallest. As a result, the user can see the notification content conveniently.

Figure 2E:
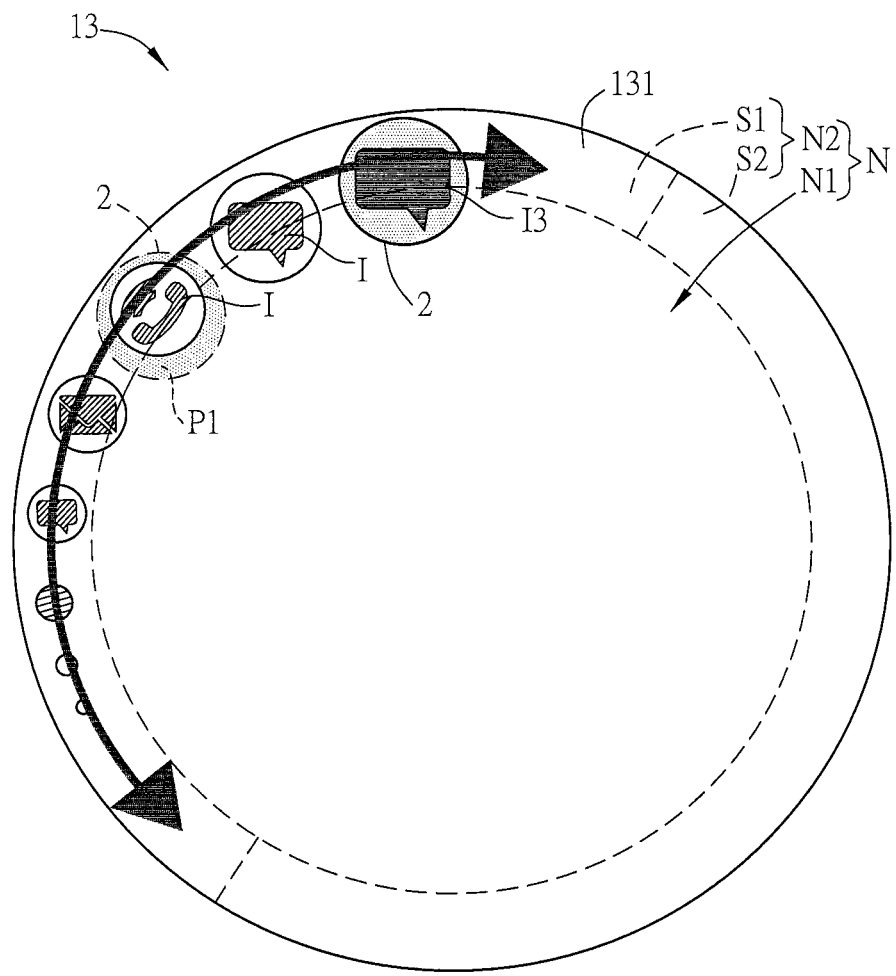

In addition, during the process that the object 2 slides from the first position P1 to the second position P2 along the first section S1, the notification icon I in the sliding path of the object 2 is highlighted in order. For example, as shown in FIG. 2E, the first position P1 is a telephone notification icon I. The object 2 slides from the first position P1 towards the upper right side along the first section S1. For example, when the object 2 touches the notification icon I3 in the sliding process, the notification icon I3 is enlarged to be displayed. Similarly, at the time, the size of the notification icon I is from big to small according to the distance between the notification icon I and the notification icon I3. That is, the closer the notification icon I and the notification icon I3 is, the bigger the size of the notification icon I is, and vice versa. Moreover, when the object 2 slides on the operation area N2, as long as the object 2 does not leave the touch display 13, even if the object 2 slides to the second section S2 from the first section S1, multiple notification icons I are kept to be displayed on the first section S1.

Figure 2F:
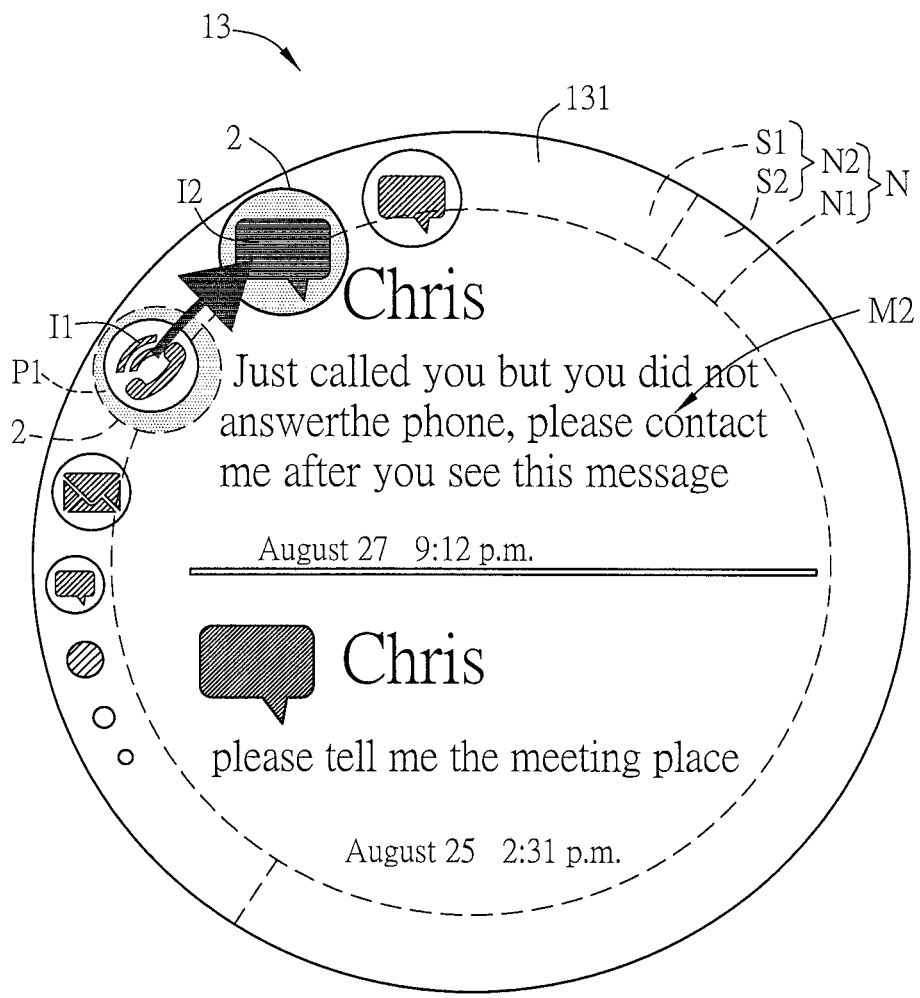

Moreover, as shown in FIG. 2F, the first notification icon I1 corresponding to the first position is a telephone notification icon. The object 2 slides to the second notification icon I2 (such as a message notification icon) corresponding to the second position P2 from the first notification icon I1 (the telephone notification icon) corresponding to the first position P1. When the object 2 stays in the position of the second notification icon I2 (the message notification icon), the second notification icon I2 is also displayed in highlight. As shown in FIG. 2E, the second notification icon I2 is enlarged displayed. The notification content (the second notification M2) corresponding to the second notification icon I2 is displayed on the information display area N1. In the embodiment, the title of the second notification M2 is "Chris". Since Chris also sends a message before. As a result, except that the second notification M2 corresponding to the second notification icon I2 is displayed on the upper part of the information display area N1, the other message from Chris before is displayed at the bottom part of the information display area N1. Similarly, multiple notification icons are beside the second notification icon I2. The size of the notification icons is changed gradually from big to small according to the distance between the notification icon and the second notification icon I2.

Figure 2G:
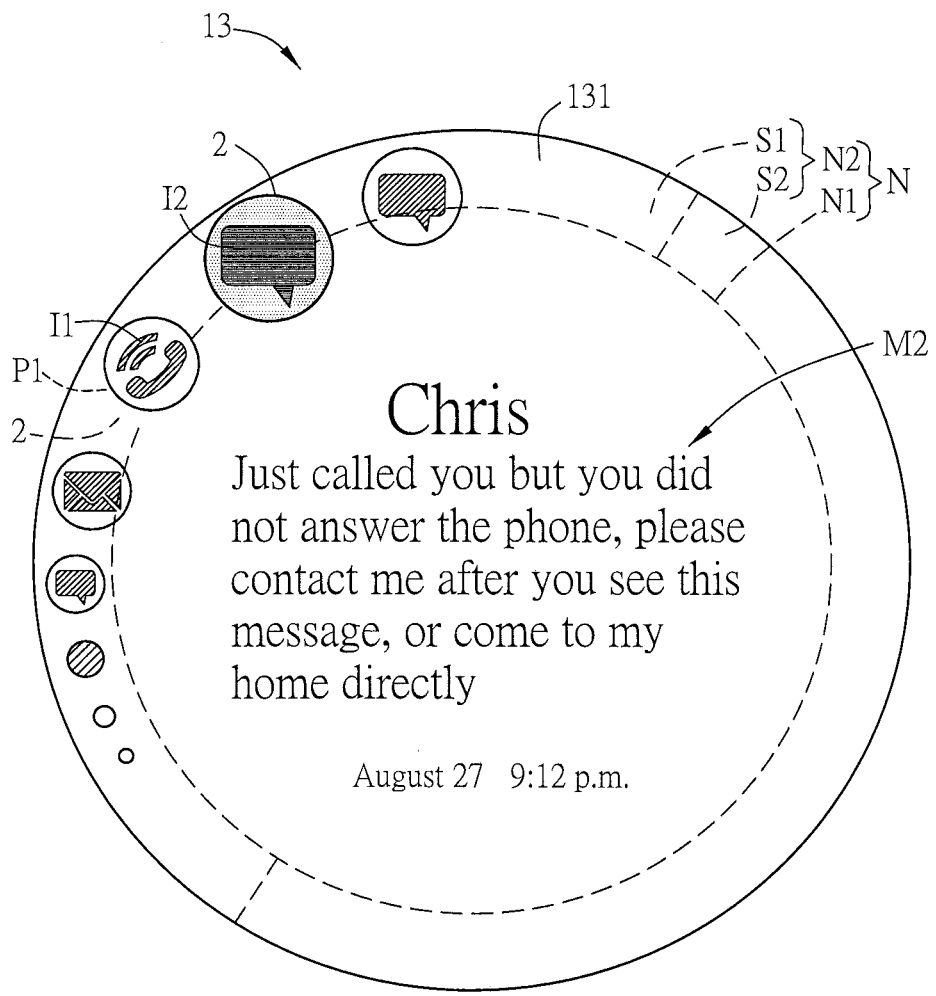

In an embodiment, the processing unit 11 receives the operation gesture that the object 2 slides to the second position P2 and then leaves the second position P2. When the object 2 does not touch any position of the touch display 13, the information display area N1 continuously displays the second notification M2 for users. In addition, due to the limited area of the information display area N1, all contents of the second notification M2 cannot be shown one time when the notification content is too much. As a result, in order to view the full content of the notification, in an embodiment, the processing unit 11 further executes the follow step. When the operation gesture (a touch instruction) that the object 2 slides to the information display area N1 from the second position P2 is received, as shown in FIG. 2G, the touch display 13 displays a full content of the second notification M2 on the information display area N1. Then, the user views the second notification M2 conveniently.

Figure 2H:
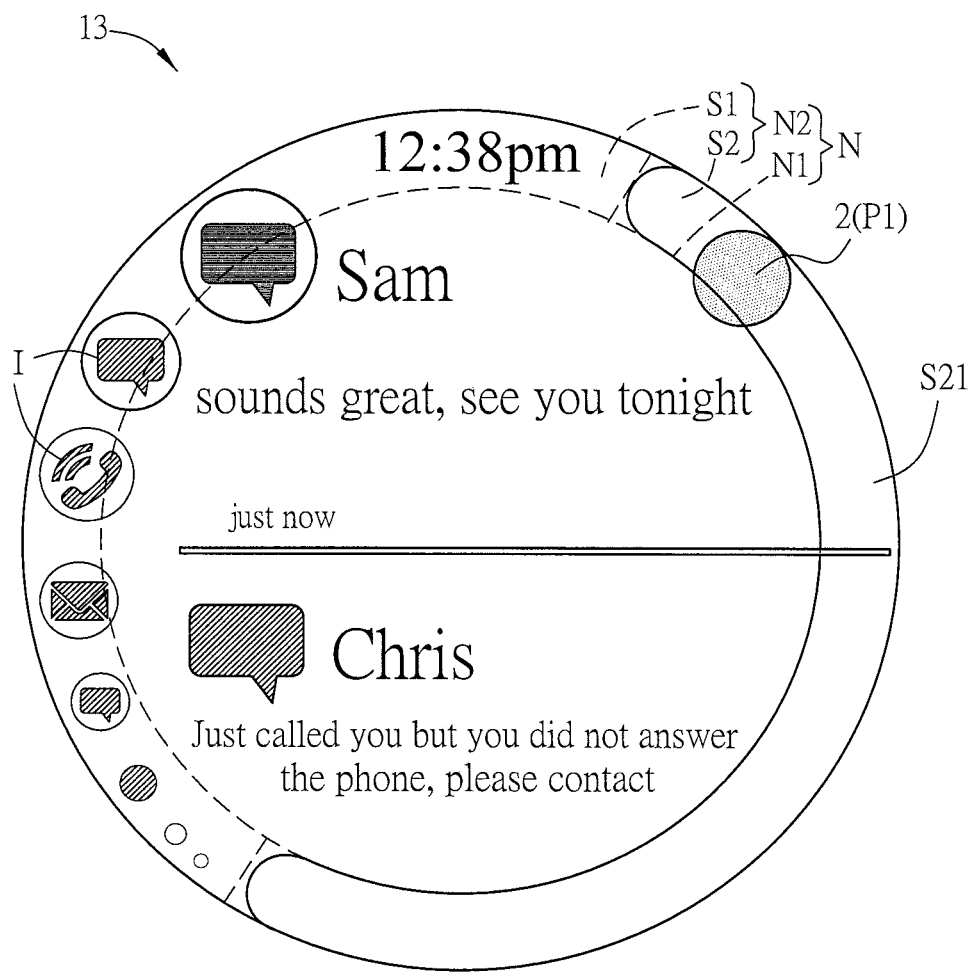

Moreover, as shown in FIG. 2H, the first position P1 touched by the object 2 is in the second section S2 of the operation area N2, the processing unit 11 controls the second section S2 of the operation area N2 to display a scroll section S21. The information display area N1 displays the notification most recent. The scroll section S21 is a scroll bar, which is not limited herein. In an embodiment, the scroll section S21 is displayed when the second section S2 is touched by the object 2. If the object 2 does not touch the second section S2, the second section S2 is not displayed.

Figure 2I:
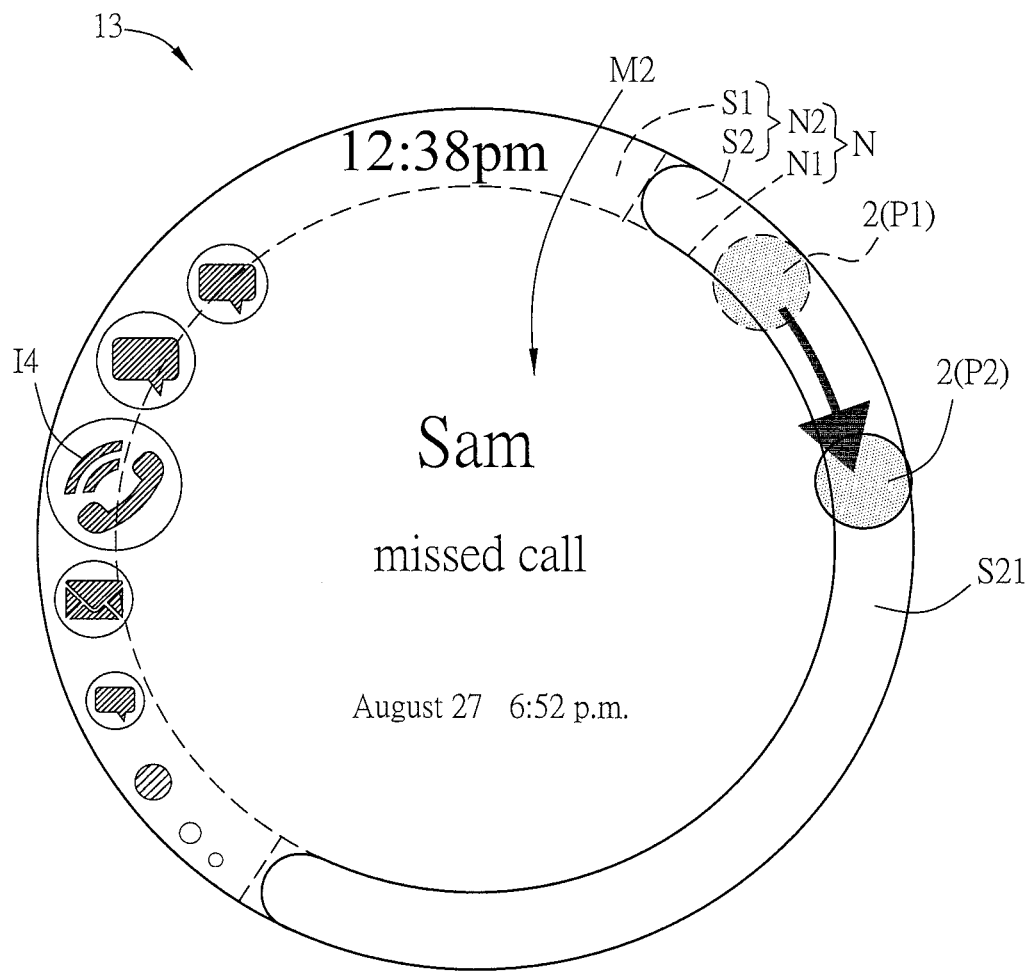

Although the first position P1 touched by the object 2 is in the second section S2 without any notification icon, the touch instruction is still received at the notification icon (such as, the notification icon whose notification is received most recently) in the first section S1 corresponding to the first position P1. Then, the first notification corresponding to the notification icon is displayed on the information display area N1 as well. As shown in FIG. 2I, when the object 2 slides to the notification icon I4 corresponding to the second position P2 from the first position P1 along the scroll section S21, the notification icon I4 corresponding to the second position P2 of the first section S1 is displayed in highlight.

In an embodiment, the object slides along the scroll section S21 in a clockwise direction or in a counter clockwise direction, which is not limited herein. In an embodiment, the object 2 slides from the first position P1 to the second position P2 corresponding to the notification icon I4 (such as, the telephone notification icon I4 in left) along the scroll section S21 toward the bottom left side. As a result, the notification icon I4 of the first section S1 in the left is enlarged to be displayed, and the information display area N1 displays the content of the notification corresponding to the notification icon I4. That is, the corresponding title ("Sam") and the content of the notification ("missed calls"). In addition, in the first section S1, the size of the other notification icons is changed gradually from big to small according to the distance between the notification icon I4 and the notification icon from near to far. Moreover, when the object 2 slides from the first position P1 to the second position P2 along the scroll section S21, the notification icons in the sliding path are displayed in highlight orderly according to the touch time on the notification icons.

As above, in the smart watch 1, when the notification image N is displayed on the touch display 13, after the object 2 touches the first notification icon I1 corresponding to the first position P1 of the operation area N2, the first notification M1 corresponding to the first notification icon I1 is displayed on the information display area N1. Then, when the object 2 slides to the second position P2 from the first position P1 along the periphery area 131, the second notification M2 corresponding to the second notification icon I2 is displayed on the information display area N1. As a result, the content of the notification can be browsed via one sliding gesture. Consequently, the user can browse the notification content conveniently and quickly in the limited operation area. Moreover, since the operation is in a specific area (the operation area N2) of the display image, the covered area of the display image is smallest. As a result, the user can see the display content conveniently.

In sum, according to the electronic device and the operation method of browsing notification in embodiments, users can browse notification contents conveniently and quickly in the limited operation area. Moreover, the operations are executed in a specific area of the display image. Then, the covered area of the display image is kept in a smallest range, which is convenient to view the notification content for users.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. An operation method of browsing notification of an electronic device, the electronic device includes a body and a touch display, the operation method of browsing notification comprising:
    displaying a notification image on the touch display when an instruction of sliding along a first direction is received at the touch display, the notification image includes an information display area and an operation area, and the operation area includes a plurality of notification icons;
    displaying a first notification content corresponding to a first notification icon at a first place of the information display area when the first notification icon of the notification icons receives a touch instruction at a first position; and
    converting to display a second notification content corresponding to the second notification icon at the first place of the information display area to replace the first notification content when the touch instruction slides from the first position to a second notification icon of the notification icons at a second position.

2. The operation method of browsing notification according to claim 1, wherein the operation area is divided into a first section and a second section, the notification icons are displayed on the first section of the operation area according to a time of receiving notifications, respectively.

3. The operation method of browsing notification according to claim 1, wherein during a path of sliding from the first position to the second position, the notification icons in the path are displayed in highlight orderly according to a touch time on the notification icons, respectively.

4. The operation method of browsing notification according to claim 2, wherein when the first position is in the second section of the operation area, a scroll section is displayed at the second section.

5. The operation method of browsing notification according to claim 1, wherein when the touch instruction is received at the first notification icon, a size of the first notification icon is enlarged.

6. The operation method of browsing notification according to claim 1, wherein a size of notification icons except the first notification icon is changed gradually according to a distance between the notification icons and the first notification icon.

7. The operation method of browsing notification according to claim 1, further comprising:
    displaying a full content of the second notification at the information display area when the touch instruction slides to the information display area from the second position.

8. An electronic device, comprising,
    a touch display;
    a body;
    a processing unit disposed in the body; and
    a memory unit disposed in the body, the memory unit is electrically connected to the processing unit, a program instruction is stored in the memory unit, when the program instruction is executed by the processing unit, the processing unit is configured to execute:
        displaying a notification image on the touch display when an instruction of sliding along a first direction is received at the touch display, the notification image includes an information display area and an operation area, and the operation area includes a plurality of notification icons;
        displaying a first notification content corresponding to a first notification icon at a first place of the information display area when the first notification icon of the notification icons receives a touch instruction at a first position; and
        converting to display a second notification content corresponding to the second notification icon at the first place of the information display area to replace the first notification content when the touch instruction slides from the first position to a second notification icon of the notification icons at a second position.

9. The electronic device according to claim 8, wherein the operation area is divided into a first section and a second section, the notification icons are displayed on the first section of the operation area according to a time of receiving notifications, respectively.

10. The electronic device according to claim 8, wherein during a path of sliding from the first position to the second position, the notification icons in the path are displayed in highlight orderly according to a touch time on the notification icons, respectively.

11. The electronic device according to claim 9, wherein when the first position is in the second section of the operation area, a scroll section is displayed at the second section.

12. The electronic device according to claim 8, wherein when the touch instruction is received at the first notification icon, a size of the first notification icon is enlarged.

13. The electronic device according to claim 8, wherein a size of notification icons except the first notification icon is changed gradually according to a distance between the notification icons and the first notification icon.

14. The electronic device according to claim 8, wherein the processing unit further executes:
    displaying a full content of the second notification at the information display area when the touch instruction slides to the information display area from the second position.

15. The operation method of browsing notification according to claim 1, wherein the first notification content and the second notification content are text contents.

16. The electronic device according to claim 8, wherein the first notification content and the second notification content are text contents.

17. The operation method of browsing notification according to claim 1, wherein the operation area is a ring and divided into a first section and a second section, two ends of the first section are respectively connected to two ends of the second section to form the ring, the notification icons are only displayed at the first section and are not displayed at the second section.

18. The electronic device according to claim 8, wherein the operation area is a ring and divided into a first section and a second section, two ends of the first section are respectively connected to two ends of the second section to form the ring, the notification icons are only displayed at the first section and are not displayed at the second section.

* * * * *